United States Patent [19]
Shinozaki et al.

[11] Patent Number: 6,074,150
[45] Date of Patent: Jun. 13, 2000

[54] PART MOUNTING STRUCTURE

[75] Inventors: Nobuya Shinozaki; Oomi Arisaka, both of Yokohama, Japan

[73] Assignee: Piolax Inc., Kenagawa-Ken, Japan

[21] Appl. No.: 09/248,605

[22] Filed: Feb. 11, 1999

[30] Foreign Application Priority Data

Feb. 12, 1998 [JP] Japan .................................. 10-044240

[51] Int. Cl.⁷ ............................. F16B 13/06; F16B 19/00
[52] U.S. Cl. ............................. 411/508; 411/48; 411/913; 24/297
[58] Field of Search .................................. 411/45, 46, 48, 411/508, 509, 913; 24/297

[56] References Cited

U.S. PATENT DOCUMENTS

| | | | |
|---|---|---|---|
| 5,111,557 | 5/1992 | Baum et al. | 411/913 X |
| 5,367,751 | 11/1994 | DeWitt | 411/508 X |
| 5,429,467 | 7/1995 | Gugle et al. | 411/508 X |
| 5,603,557 | 2/1997 | Marks et al. | |
| 5,671,513 | 9/1997 | Kawahara et al. | 411/508 X |
| 5,774,949 | 7/1998 | Cornell et al. | 411/508 X |

FOREIGN PATENT DOCUMENTS

| | | |
|---|---|---|
| 0163360A2 | 12/1985 | European Pat. Off. . |
| 0860616A1 | 2/1998 | European Pat. Off. . |
| 3177607 | 1/1991 | Japan . |
| 529000 | 11/1940 | United Kingdom . |
| 659855 | 10/1951 | United Kingdom . |
| 2001383A | 1/1979 | United Kingdom . |
| 1572734 | 8/1980 | United Kingdom . |

*Primary Examiner*—Neill Wilson
*Attorney, Agent, or Firm*—Howard & Howard

[57] ABSTRACT

A part mounting structure has a projection which is provided on one side of a part and includes a recess portion. A mounting member, which is adapted to be received in and locked with a mounting hole of a base, has a locking member which has a latch claw to be latched with the recess portion of the projection.

21 Claims, 6 Drawing Sheets

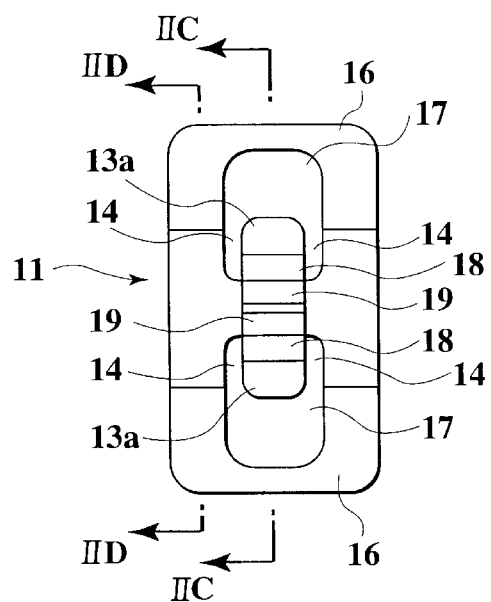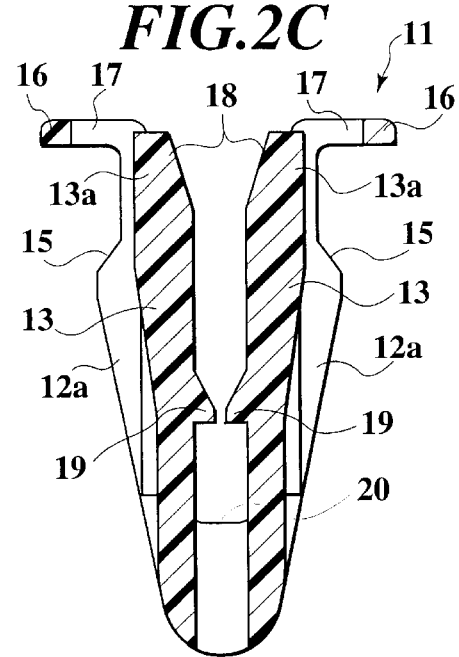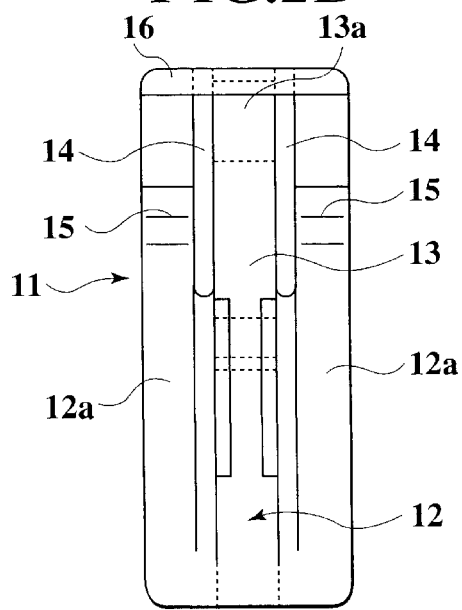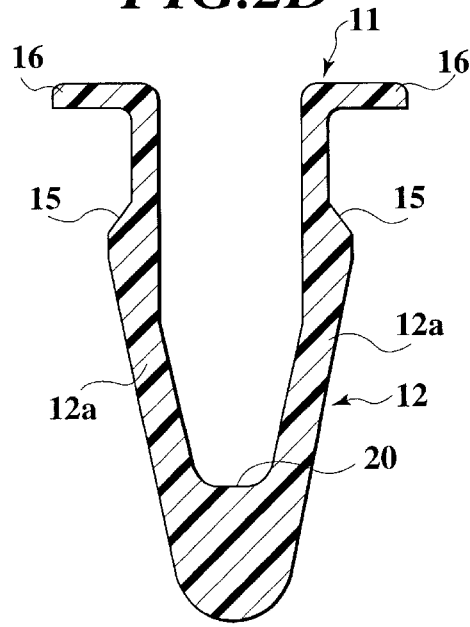

PART MOUNTING STRUCTURE

BACKGROUND OF THE INVENTION

1. Field of the Invention

The present invention relates to a part mounting structure for mounting a part to a predetermined panel using a clip with one touch. The inventive structure is useful for internal and exterior parts of automobiles such as a trim piece.

2. Description of the Related Art

A conventional part mounting structure is disclosed in, for example, Japanese Patent Application Laid-Open No. 3-177607 (1991).

In the conventional mounting structure, a part such as a trim piece has a projection integrally formed with and extending from its rear surface. The trim piece is mounted to a panel in which a mounting hole has been formed using a U-shaped metal clip. A rib wall is formed integrally on both side edges of the projection, and a projection is formed on a side surface of the projection between the rib walls. Meanwhile, a pair of spring pieces, which are projected upward and elastically latched with the edge of the mounting hole of the panel, are notched in a central portion of both the walls of the metal clip. A pair of return-preventing claws, which are slanted in a downward and inward direction, are formed so as to be bent on an upper portion of both the side walls where flanges exist.

According to this mounting structure, since a part can be mounted to a panel by utilizing an elastic force of a metal clip, this structure has an advantage that a properly firm mounting state is ensured. On the contrary, in the case where a panel is made of a metal material such as an iron plate, when a metal clip was pushed into the panel, an unpleasant sound typically occurred because of the rubbing contact between the mounting hole of the metal panel and the metal clip.

For this reason, in the present field, various resin clips has been attempted to be used instead of the metal clip. However, the resin clips only provide an inferior security for mounting compared with the metal clips. Therefore, using resin clips includes the shortcoming that the part becomes unexpectedly unstable due to the insufficient mounting force, or in some cases, the mounted part may slip out of the panel.

SUMMARY OF THE INVENTION

It is an object of the present invention to provide a part and a part mounting structure which ensure a sufficient mounting force when a resin clip is used.

There is provided a part mounting structure comprising a projection which is provided to a part and has a recess portion; and a mounting member which is to be locked with a mounting hole of a base and which has a locking member which has a latch claw to be latched with the recess portion of the projection.

Preferably, the locking member has a free end portion, and when the mounting member is locked with the mounting hole of the base with the latch claw of the locking member latched with the recess portion of the projection to be integrated with the mounting member, the free end portion of the locking member reaches the mounting hole of the base.

Preferably, the free end portion of the locking member comes in contact with an inner wall defining the mounting hole of the base.

Preferably, the free end portion of the projection has a surface, the locking member has a surface on a base end portion, and when the mounting member is locked with the mounting hole of the base with the latch claw of the locking member latched with the recess portion of the projection to be integrated with the mounting member, the surface on the base end portion of the locking member comes close to and faces the surface of the projection.

Preferably, the mounting member has a wall member, the wall member has a projecting shoulder portion, and the projecting shoulder portion is locked with the mounting hole of the base.

Preferably, the surface on the free end portion of the locking member comes in contact with the surface on the base end portion of the projection.

Preferably, the free end portion of the locking member has a thickness that is thicker than that of other portions thereof.

Preferably, the projection has a portion corresponding to the free end portion of the locking member and the portion of the projection is thicker than other portions.

Preferably, the wall member has an end portion and a flange disposed on the end portion relative to the projecting shoulder portion. The flange preferably has a space for receiving the locking member.

Preferably, the wall member has a thinnest portion between the projecting shoulder portion and the flange. The thinnest portion of the wall member preferably corresponds to the mounting hole of the base when the mounting member is locked with the mounting hole of the base.

BRIEF DESCRIPTION OF THE DRAWINGS

FIG. 2A is a plan view of a resin clip.

FIG. 2B is a side view of the resin clip.

FIG. 2C is a sectional view taken along line IIC—IIC of FIG. 2A.

FIG. 2D is a sectional view taken along line IID—IID of FIG. 2A.

DETAILED DESCRIPTION OF THE PREFERRED EMBODIMENT

Figure 1:
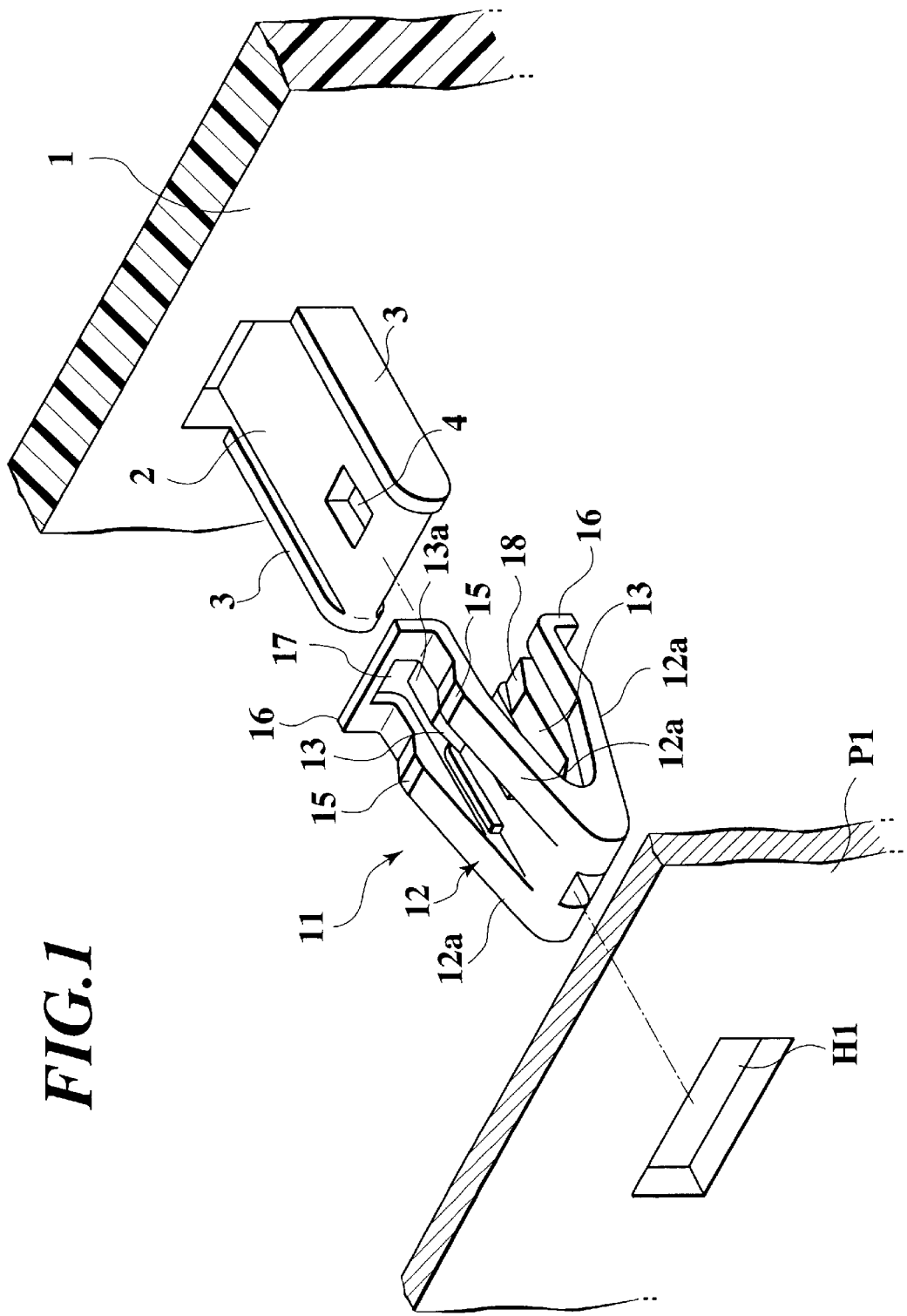
FIG. 1 is an exploded perspective view of a main section of a mounting structure according to an embodiment of the present invention.

The following will describe in detail the preferred embodiment of the present invention with reference to the drawings. As shown in FIG. 1, a part mounting structure of the present embodiment has a part 1 such as a trim piece or molding, for example, and a projection 2 that is integrally formed and projects from a rear surface of the part 1. The part 1 is mounted into a mounting hole H1 provided in a metal panel P1 as a base using a U-shaped resin clip 11 as a mounting member.

The part projection 2 includes rib walls 3 that preferably are formed continuously on both side edges of the projection 2. A pierced recess portion 4, which latches with a latch claw of a locking piece, mentioned later, is formed in the projection 2. This recess portion 4 may be formed simply by recessing both side surfaces of the projection 2 without piercing through the projection 2.

In addition, as shown best in FIG. 2D, U-shaped side walls 12 are provided as wall members in the resin clip 11 so that their sides face each other. As shown in FIGS. 2A and 2B, a longitudinal slit 14 is formed between the side walls 12. As shown in FIG. 2C, a pair of locking pieces 13 form a locking member. The locking pieces 13 are independently flexible and are provided so as to come inside the slits 14. Projecting shoulder portions 15 are formed respectively on both side portions 12a of the side walls 12 partitioned by the locking pieces 13. The projecting shoulders 15 are to be lockingly engaged with an edge of the mounting hole H1 of the panel P1. Outward flanges 16 are formed integrally with and extending outward from upper end portions of both the side portions 12a of the side walls 12. The flanges 16 preferably have a U-shape and include spaces 17, which are continued respectively from the slits 14.

In addition, extended free end portions 13a preferably are arranged so that free end portions of the paired locking pieces 13 are relatively thickened and extend into the spaces 17 of the flanges 16. Further, the free end portions 13a have a length that is great enough to interfere with or come into contact with an inner peripheral surface of the hole H1 when the resin clip 11 is mounted into the mounting hole H1 of the panel P1 (see, FIG. 4b).

Guiding-use taper cut surfaces 18 preferably are formed respectively on the inner surfaces of the extended free end portions 13a and face each other. A pair of latch claws 19, which are intended to be latched with the pierced recess portion 4, are formed respectively on inner surfaces of the locking pieces 13 on the base end portion side and face each other.

Further, both the side portions 12a of the side walls 12 preferably are partitioned by the paired locking pieces 13, and they are in a position more outer than the locking pieces 13. Moreover, the whole thickness of the side portions 12a preferably is thinner than that of the locking pieces 13. Therefore, compared with the locking pieces 13, a larger space that allows inward deflection is provided inside both the side portions 12a. When the resin clip 11 is pushed into the mounting hole H1 of the panel P1, since both the side portions 12a are deflected greatly without requiring much strong force, the resin clip 11 is pushed smoothly.

In addition, portions just below the flanges 16, namely, portions corresponding to the inner peripheral surface of the mounting hole H1 of the panel have a thickness thinner than that of the other portions. The shape and the thin thickness of the flanges 16 induce the twisting deflection of the resin clip 11 comparatively easily.

Figure 3:
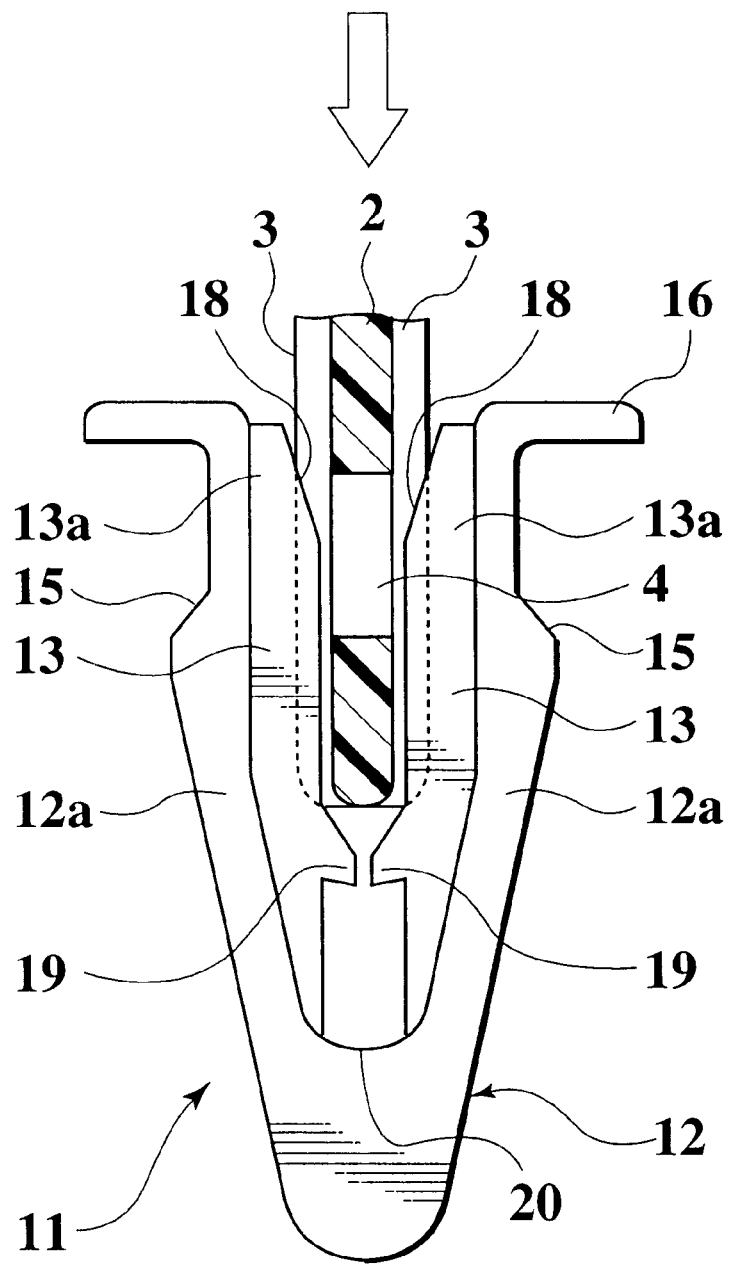
FIG. 3 is an explanatory drawing showing a projection of a part inserted into the resin clip.

Therefore, as shown in FIG. 3, in the case where the trim part 1 is mounted to the panel by using the resin clip 11, first a pair of the projections 2 are guided by the rib walls 3 on the side of the projection 2 and the taper cut surfaces 18 on the side of the locking pieces 13 so as to be inserted between the paired locking pieces 13. The forward end of the projection 2 comes in contact with the latch claws 19 facing each other, and while the paired locking pieces 13 are opened outward about the base end portion side, which is provided together with both the side walls 12 continuously with a bottom portion 20, the forward end of the projection 2 passes between the latch claws 19. When the forward end of the projection 2 comes in contact with the bottom portion 20 of the resin clip 11, the sides of the latch claws 19 simultaneously are latched with the recess portion 4 of the projection 2. As a result, the resin clip 11 is mounted to the part 1 on the side of the projection 2.

Figure 4A:
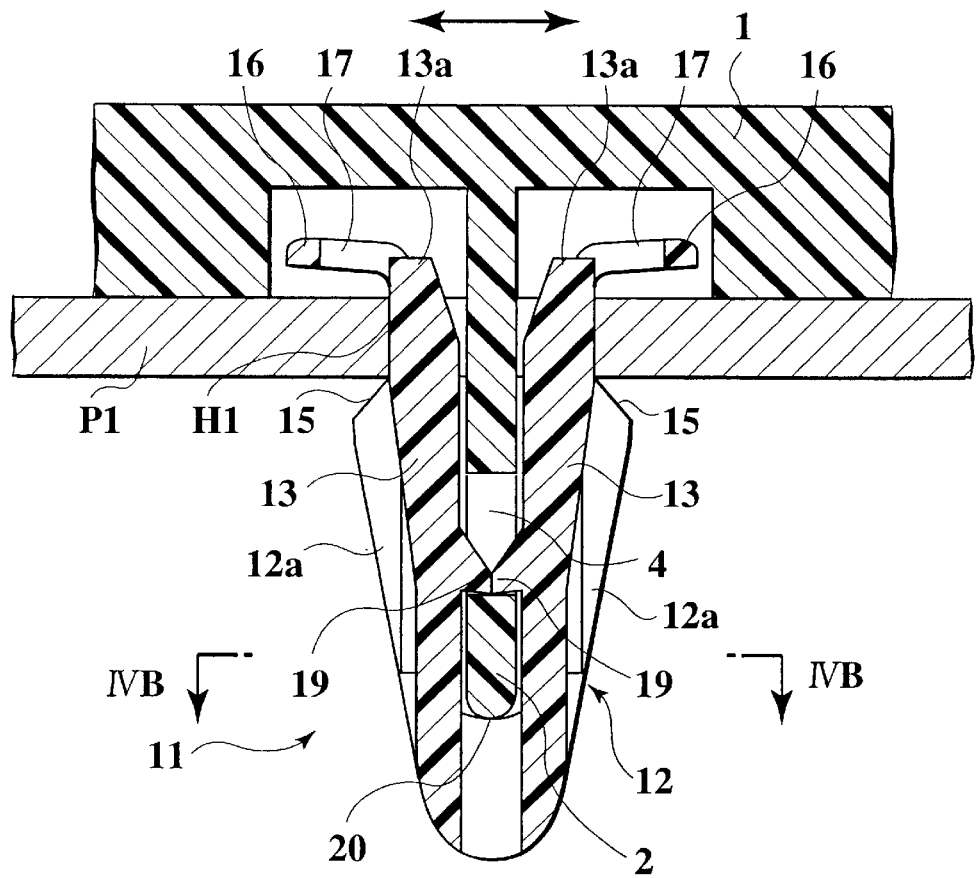
FIG. 4A is a sectional view showing the part mounted to a panel using the resin clip.

Next, as shown in FIG. 4A, when the resin clip 11 is pushed into the mounting hole H1 of the panel P1, while both of the side walls 12 are greatly deflected inward by utilizing their inner spaces, the resin clip 11 passes in the mounting hole H1. The projecting shoulders 15 of both side portions 12 are elastically lockingly engaged with the edge of the mounting hole H1 of the panel P1, and the part 1 is mounted to the panel P1 with one touch. In this mounting state, the outer surfaces of the free end portions 13a come in contact with the inner peripheral surface of the mounting hole H1 to be pressed inward. As a result, the thick inner surfaces of the free end portions 13a are automatically pushed until they come extremely close to or in contact with the corresponding side surfaces of the projection 2.

The firm latch state of the latch claws 19 with the recess portion 4 of the projection 2 is ensured by pressing the free end portions 13a of the locking pieces 13. Even if an outer force is applied to the resin clip 11 in the pulling-out direction, the clip 11 can cope with the outer force sufficiently. At the same time, even if an unexpected outer force is applied to the part 1 in a lateral direction (a direction of an arrow in the drawing), the projection 2 bumps against or touches to the corresponding locking pieces 13 so that the part 1 can cope with or counteract this outer force. Deformation of the whole resin clip 11 including both the side walls 12 in the above-mentioned direction can be prevented efficiently, and fears of the part 1 being unexpectedly unstable and slipping out of the panel P1 are eliminated completely. Therefore, even if an unexpected outer force is continued to be applied to the part 1 for a long time, both the side walls 12 of the resin clip 11 do not receive an unnecessary force, and the projecting shoulders 15 always are lockingly engaged with the edge of the mounting hole H1. Therefore, in any states, the part 1 is provided with it being mounted securely.

Figure 4B:
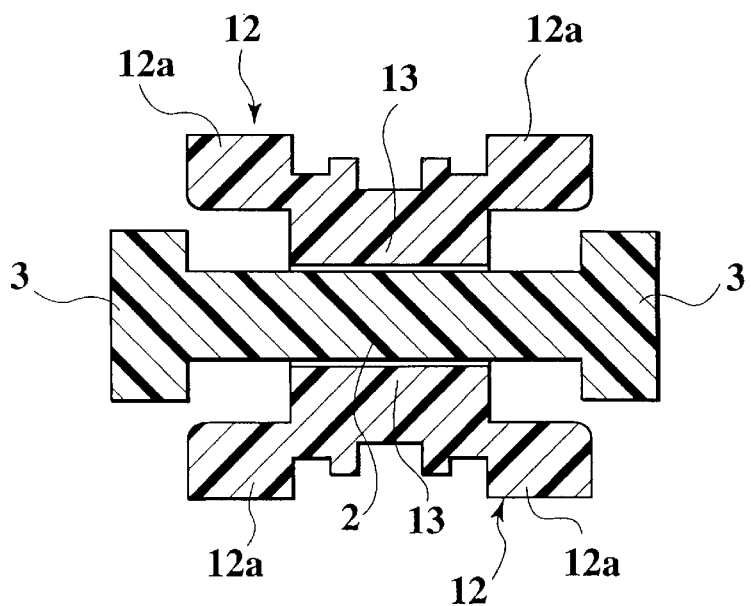
FIG. 4B is a sectional view taken along line IVB—IVB of FIG. 4A.

Furthermore, as shown in FIG. 4B, in such a state, the thick inner surfaces of the base end side of the locking pieces 13 also come close to the side surface of the projection 2 to face each other, and the resin clip 11 is prevented from being deformed in the lateral direction and, as a result, is prevented from being slanted unnecessarily in the mounting hole H1.

In addition, depending upon a size of the part 1, a plurality of the projections 2 are normally projected in parallel from a real face of the part 1, and a plurality of the mounting holes H1 are bored on the panel P1 corresponding to the projections 2. In this case, if the parallel alignment between the projections 2 and the holes H1 is disordered, the resin clip 11 is pushed into the mounting hole H1 forcibly due to the disorder.

Figure 5A:
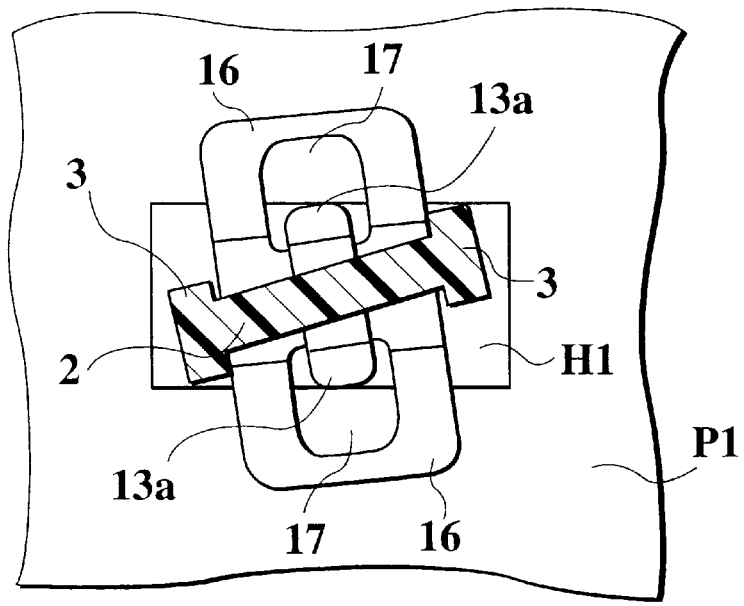
FIG. 5A is an explanatory drawing showing an outward flange side of the resin clip twisted in a mounting hole.
Figure 5B:
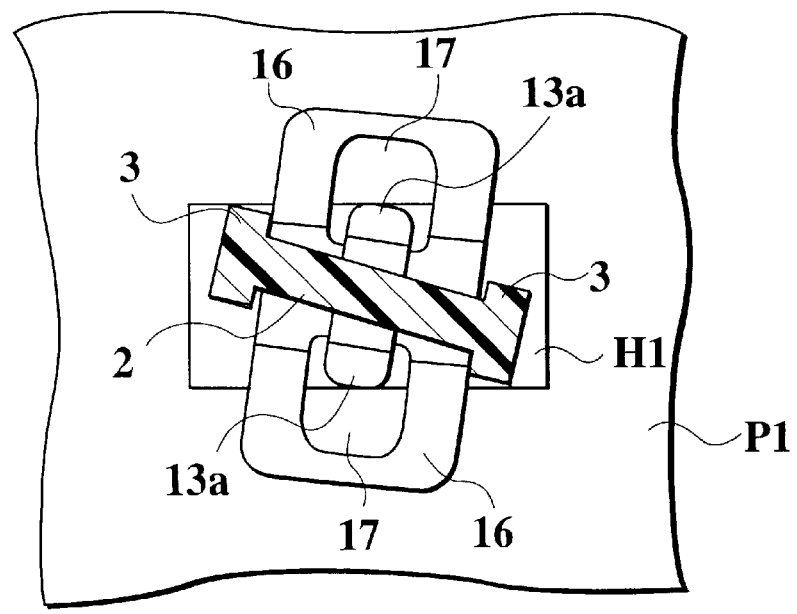
FIG. 5B is an explanatory drawing showing the outward flange side of the resin clip twisted in a direction opposite to that of FIG. 5A in the mounting hole.

However, in the present embodiment, as mentioned above, the free end portions 13a of the locking pieces 13 in the central position come into the spaces 17 of the flanges 16 in a free state. Further, as shown in FIGS. 5a and 5b, if the flanges 16 are deflected in the mounting hole H1 of the panel P1 (when there is not a perfect parallel alignment as mentioned above, for example) the disorder is absorbed efficiently. Therefore, the firm mounting state of the part 1 is ensured. In this case, since a pair of the locking pieces 13 are positioned in the center of the resin clip 11, their function is not obstructed, and on the contrary, the deflection of the flanges 16 is promoted.

Figure 6:
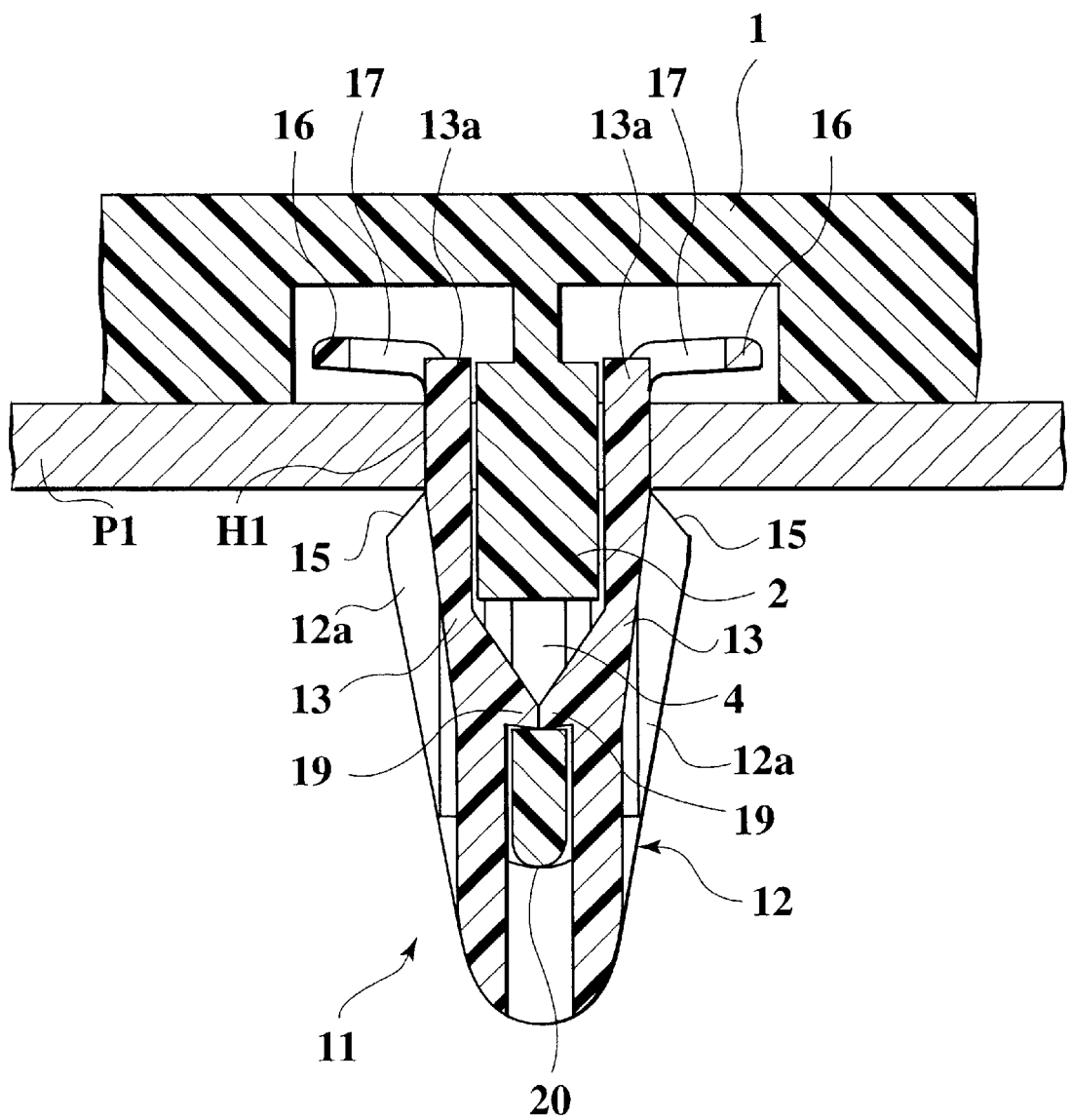
FIG. 6 is a sectional view showing a part of another embodiment mounted to the panel via the resin clip.

In the above embodiment, in order to bring the inner surfaces of the free end portions 13a and the inner surface of the projection 2 as close as possible to each other, the inner surfaces of the free end portions 13a are thickened to the direction of the inner surface of the projection 2. An alternative arrangement is shown in FIG. 6, when the side surface of the projection 2 is thickened to the direction of the end portion 13a of the locking piece 13. The same effect is achieved because the resin clip 11 is prevented from being deformed in the lateral direction.

According to the above embodiments, when the resin clip 11 is mounted to the projection 2 of the part 1 and then is pushed into the mounting hole H1 of the panel P1, the projecting shoulders 15 formed on both the side walls 12 of the resin clip 11 are lockingly engaged with the edge of the mounting hole H1, and the part 1 is mounted to the panel P1 with one touch. In this state, the outer surfaces of the extended free end portions 13a of the paired locking pieces 13 effectively close in on and face the side surface of the projection 2 as the portions 13a come in contact with the inner peripheral surface of the mounting hole H1, and the inner surfaces of the locking pieces 13 are pressed against the projection 2. As a result, even if an unexpected outer force is applied to the part in the lateral direction (i.e., to the right or left in FIG. 4a or 6), the projection 2 bumps against the locking pieces 13, and the resin clip 11 (including both the side walls 12) is efficiently prevented from being deformed in the lateral direction. Therefore, there is no fear of the part 1 being unexpectedly unstable and slipping out of the panel P1.

In addition, since the inner surfaces of the base end portions of the locking pieces 13 come close to and face the inner surface of the projection 2, the resin clip 11 is prevented also from being slanted unnecessarily in the mounting hole H1.

In addition, even if the desired parallel alignment between multiple projections 2 is disordered, for example, the extended free ends 13a of the locking pieces 11 in the central position come into the spaces 17 of the outward flanges 16 in a free state, and the thickness of the portions of the side walls 12 just below the outward flanges 16 is thinned. Therefore, the outward flanges 16 of the resin clip 11 are deflected together with the projection 2 in the mounting hole H1 of the panel P1 according to the disorder of the parallelism, and the disorder is absorbed efficiently. Therefore, the firm mounting state of the part is ensured.

The preceding description is exemplary rather than limiting in nature. The scope of legal protection given to this invention can only be determined by studying the following claims.

What is claimed is:

1. A part mounting assembly, comprising:
   a part including a projection having a recess portion; and
   a mounting member that is received in and locked with a mounting hole of a base, the mounting member having a locking member, the locking member having a latch claw to be latched with the recess portion of the projection.

2. A part mounting assembly according to claim 1, wherein said locking member has a free end portion, when said mounting member is locked with the mounting hole of the base with said latch-claw of said locking member latched with said recess portion of said projection, said free end portion of said locking member is positioned to contact the mounting hole of said base.

3. A part mounting assembly according to claim 2, wherein said free end portion of said locking member comes in contact with an inner wall defining the mounting hole of the base.

4. A part mounting assembly according to claim 2, wherein said free end portion of said locking member has a thickness, said thickness of said free end portion is thicker than that of other portions of said locking member.

5. A part mounting assembly according to claim 2, wherein said projection has a portion corresponding to said free end portion of said locking member, said portion of said projection having a thickness that is greater than other portions of said projection.

6. A part mounting assembly according to claim 2, wherein said free end portion of said locking member has a surface, said projection has a surface on a base end portion, and when said mounting member is locked with said mounting whole of said base, with said latch claw of said locking member latched with said recess portion, said surface on said free end portion of said locking member is positioned adjacent to end facing said surface on said base end portion of said projection.

7. A part mounting assembly according to claim 6, wherein said surface on said free end portion of said locking member comes in contact with said surface on said base end portion of said projection.

8. A part mounting assembly according to claim 1, wherein said mounting member has a wall member, said wall member has a projecting shoulder portion, and said projecting shoulder portion is locked with said mounting hole of said base.

9. A part mounting assembly according to claim 8, wherein said wall member has an end portion and a flange, said flange is disposed on said end portion relative to said projecting shoulder portion, said flange has a space that receives said locking member.

10. A part mounting structure according to claim 9, wherein said wall member has a portion that is thinner than other portions of said wall member between said projecting shoulder portion and said flange, said portion of said wall member corresponding to said mounting hole of said base when said mounting member is locked with said mounting hole of said base.

11. A part mounting assembly according to claim 1, wherein said locking member has on a base end side thereof a surface positioned adjacent to and facing a surface of said projection.

12. A part mounting assembly according to claim 1, wherein said mounting member has a pair of wall members arranged along said locking member, and said locking member is positioned in a center of said pair of wall members.

13. A locking clip device for locking a part in place on a base surface having an opening, comprising:
   a resin clip adapted to be received in the opening and including
   side walls extending between first and second ends of said clip, said side walls including inner surfaces and shoulder portions on outer surfaces, respectively, and
   a locking member including a latch portion adapted to engage a corresponding structure on the part and a free end that is positioned relative to said side walls to extend beyond said shoulder portions and to engage a portion of the part when the resin clip is received in the opening.

14. The device of claim 13, where in said locking member includes two locking pieces facing each other, said locking pieces including first ends having a first thickness and free ends having a second thickness that is greater than said first thickness.

15. The device of claim 13, including a flange at the first end of each said side wall.

16. The device of claim 15, wherein each said free end is spaced away from said clip second end a distance that is approximately equal to a distance that said flanges are spaced from said clip second end.

17. An assembly for securing a part to a base having an opening formed in the base, comprising:

a part including a projection extend ing out of one surface of the part;

a resin clip including side walls having shoulder portions that engage the opening in the base to secure the resin clip to the base, said clip including a locking member that is at least partially separate from the side walls, said locking member securing said projection to said clip and preventing said clip and said part from being separated from the base after the projection has been received by the clip and the clip has been received by the opening in the base.

18. The assembly of claim 17, wherein the locking member includes two locking pieces facing each other and spaced apart a distance to receive the projection, a first end of the locking pieces including a ramped surface to guide the projection into a position between the locking pieces, each said locking piece including a latch member that engages a corresponding structure on the projection to secure the projection to the clip.

19. The assembly of claim 18, wherein said first end of each said locking piece has a first thickness and an opposite end of each said locking piece has a second thickness that is smaller than said first thickness, said first ends of said locking pieces being positioned relative to said shoulder portions such that said first ends are positioned to engage a portion of the opening in the base and a portion of said projection that is received between said locking pieces when said clip is secured within the opening in the base.

20. The assembly of claim 19, wherein said projection includes a portion having a thickness that is greater than a second thickness of a remaining portion of said projection.

21. The assembly of claim 17, wherein said side walls each include a flange at a first end of said side walls and wherein said side walls and said flanges each include a central space and wherein the locking member is positioned within said spaces.

* * * * *